United States Patent
Vehling et al.

(10) Patent No.: US 12,350,746 B2
(45) Date of Patent: Jul. 8, 2025

(54) TRANSVERSAL TABLE FOR A WOODWORKING MACHINE AND WOODWORKING MACHINE HAVING SUCH A TRANSVERSAL TABLE, AND METHOD FOR CONTROLLING A WOODWORKING MACHINE

(71) Applicant: ALTENDORF GMBH, Minden (DE)

(72) Inventors: Andreas Vehling, Hespe (DE); Jürgen Ruchatz, Minden (DE); Karl-Friedrich Schröder, Espelkamp (DE)

(73) Assignee: ALTENDORF GMBH, Minden (DE)

( * ) Notice: Subject to any disclaimer, the term of this patent is extended or adjusted under 35 U.S.C. 154(b) by 655 days.

(21) Appl. No.: 17/611,341

(22) PCT Filed: May 14, 2020

(86) PCT No.: PCT/EP2020/063487
§ 371 (c)(1),
(2) Date: Nov. 15, 2021

(87) PCT Pub. No.: WO2020/229610
PCT Pub. Date: Nov. 19, 2020

(65) Prior Publication Data
US 2022/0203465 A1 Jun. 30, 2022

(30) Foreign Application Priority Data
May 16, 2019 (DE) .......................... 202019102750.9

(51) Int. Cl.
*B23D 47/04* (2006.01)
*B27B 27/08* (2006.01)
*B27B 27/10* (2006.01)

(52) U.S. Cl.
CPC .............. *B23D 47/04* (2013.01); *B27B 27/08* (2013.01); *B27B 27/10* (2013.01)

(58) Field of Classification Search
CPC ......... B23D 47/04; B27B 27/10; B27B 27/08; B27B 27/06; B27B 27/02
(Continued)

(56) References Cited

U.S. PATENT DOCUMENTS

| | | | |
|---|---|---|---|
| 5,490,665 A * | 2/1996 | Thiele ................ | G06K 7/10613 269/307 |
| 2011/0056344 A1 * | 3/2011 | Dick ...................... | B27B 31/06 83/13 |

FOREIGN PATENT DOCUMENTS

| | | |
|---|---|---|
| AT | 505362 | 12/2008 |
| CN | 203901427 | 10/2014 |

(Continued)

*Primary Examiner* — Liang Dong
(74) *Attorney, Agent, or Firm* — PRICE HENEVELD LLP

(57) ABSTRACT

A cross table for a woodworking machine, such as a sliding table saw, and to a woodworking machine having such a cross table. The cross table includes a horizontally lying first workpiece support surface, a stop rail arranged above the first workpiece support surface and having a first workpiece stop surface on a first side of the stop rail, which is arranged such that a workpiece resting on the first workpiece support surface horizontally in front of the stop rail can be placed with a side edge against the workpiece stop surface. The stop rail has a second workpiece stop surface on a second side of the stop rail opposite the first side, the second workpiece stop surface arranged such that a workpiece resting on the first workpiece support surface horizontally behind the stop rail can be placed with a side edge against the workpiece stop surface.

22 Claims, 15 Drawing Sheets

(58) Field of Classification Search
USPC .................................................. 30/369–379.5
See application file for complete search history.

(56) References Cited

FOREIGN PATENT DOCUMENTS

| | | | |
|---|---|---|---|
| CN | 104526774 | 4/2015 | |
| DE | 1628864 | 10/1971 | |
| DE | 2910095 | 9/1980 | |
| DE | 3308749 | 9/1984 | |
| DE | 19716971 | 12/1998 | |
| DE | 20023378 | 1/2004 | |
| DE | 502006001741 | 11/2008 | |
| DE | 202009007058 | 9/2010 | |
| EP | 1205285 | 5/2002 | |
| EP | 1837110 | 9/2007 | |
| EP | 2002912 | 12/2008 | |
| EP | 2002912 A2 * | 12/2008 | ........... B23D 47/025 |
| EP | 2100701 A1 * | 9/2009 | ............. B27B 27/06 |
| EP | 2106889 | 10/2009 | |
| EP | 2228184 A1 * | 9/2010 | ........... B23D 47/025 |
| EP | 2251126 | 11/2010 | |
| EP | 2251126 A2 * | 11/2010 | ........... B23D 47/025 |
| WO | 200226452 | 4/2002 | |

* cited by examiner

TRANSVERSAL TABLE FOR A WOODWORKING MACHINE AND WOODWORKING MACHINE HAVING SUCH A TRANSVERSAL TABLE, AND METHOD FOR CONTROLLING A WOODWORKING MACHINE

CROSS-REFERENCE TO FOREIGN PRIORITY APPLICATION

The present application claims the benefit under 35 U.S.C. §§ 119(b), 119(e), 120, and/or 365(c) of PCT/EP2020/063487 filed May 14, 2020, which claims priority to German Application No. DE 20 2019 102 750.9 filed May 16, 2019.

FIELD OF THE INVENTION

The invention relates to a cross table for a woodworking machine, in particular, for a sliding table saw, a woodworking machine with a cross table and a method.

BACKGROUND OF THE INVENTION

Woodworking machines are basically known. Woodworking machines include, for example, circular saws, sliding table saws, planing machines, and milling machines, which may also be designed as circular saw-milling machines.

Woodworking machines, and sliding table saws in particular, often have a cross table that cantilevers out laterally. Cantilevered cross tables are usually arranged on a sliding carriage linearly guided on the main body of the machine. A large workpiece can thus be arranged on the sliding carriage and on the cross table and moved by means of the sliding carriage relative to a tool arranged on the woodworking machine, in particular, a circular saw blade. However, a cross table may also be linearly guided directly on the main body of the machine. The workpiece can be machined by the relative movement between the workpiece and the tool, in particular cut by a circular saw blade.

In order to be able to make precise cuts on the workpiece, sliding table saws regularly have a stop, in particular, an angle stop. An angle stop is also referred to as an angle mitre stop. The angle stop usually projects in the same direction as the cross table. With an angle stop, both right-angle cuts and mitre cuts are possible on a workpiece. Angle stops are usually arranged to be movable relative to the cross table. This is done, for example, by moving the angle stop, in particular, by dismantling the angle stop and mounting it at a different position on the cross table. This is particularly necessary for allowing a workpiece to be placed either in front of or behind the angle stop. Whether a workpiece is preferably placed by the operator in front of or behind the angle stop depends, on the one hand, on the machining situation and, on the other hand, on the type of workpiece. For example, heavy and stiff workpieces are preferably placed and cut in front of the angle stop. In this case, the operator pushes the workpiece against the angle stop, which serves as a quasi counter stop and holds the workpiece in the desired orientation. The horizontal cutting force pushes the workpiece away from the angle stop. Lighter workpieces or strips, on the other hand, are preferably placed and cut behind the angle stop. In this case, the operator pushes the angle stop and it pushes the workpiece in front of it and at the same time serves to align the workpiece. The horizontal cutting force presses the workpiece against the angle stop.

While it is true that the possibility of moving the angle stop is advantageous for this reason and, especially when performing angle mitre cuts with a swivelled angle stop, ensures a sufficient support surface and thus a safe support of the workpiece on the cross-cut table that relieves the operator. In practice, however, disassembly and assembly of the angle stop leads to undesirable loss of time and effort.

EP 2 002 912 B1 teaches a cantilever table for a sizing or panel saw, the supporting surface of which is coupled to a fence in such a way that the supporting surface moves with the movement of the fence. As a result, the reduction of the possible supporting surface for a workpiece is less pronounced when an angle is set. However, a disadvantage of this cantilever table is that the possible supporting surface for a workpiece is only available in front of the stop. The possible surface for supporting a workpiece behind the stop is small, so that no support of a workpiece for machining with the saw is possible here. Analogous to the known state of the art, the fence must also be moved here, i.e., disassembled and reassembled, in order to obtain the required support surfaces.

EP 2 106 889 B1 teaches a stop ruler that can be moved in the longitudinal direction. The stop ruler is arranged on a cross table, the cantilever direction of which is adjustable. The stop ruler can be arranged at a front edge or at a rear edge of the cross table. This is done by relocating the stop ruler by first disassembling it and then reassembling it at the other edge. On the one hand, this leads to a time expenditure for the operator of the sliding table saw and, moreover, possibly to wear on the cross-cut table and on the stop ruler. In addition, only limited accuracy can be achieved with the fence that can be moved between two positions.

A sizing and mitre circular saw is known from DE 33 08 749 C2. In this circular saw, a feed table is provided which comprises a workpiece support formed by a table plate, a plurality of workpiece support rails and an extendable workpiece support. A mitre fence rail is arranged on the table top, which can be placed in a plurality of plug holes of plug hole rows. A disadvantage of this embodiment is that the table top forms a substantial portion of the workpiece support surface, and therefore it is necessary to reposition the mitre fence rail to allow the user to access the mitre fence rail in the various modes of operation of the circular saw.

A sliding table for circular table saws is known from DE2910095 A. This sliding table also has a table top whose supporting surface can be enlarged by means of extendable guide rods and round rods. A stop is arranged on the table top. The disadvantage here is again that the table top, which essentially forms the support surface, obstructs access to the fence for the user and the fence is therefore only accessible to the user from one side.

It is an object of the present invention to provide a cross table for a woodworking machine, in particular, for a sliding table saw, and a woodworking machine having such a cross table, which provide higher accuracy, better operability and/or lower wear.

This task is solved according to the invention by a cross table for a woodworking machine, in particular, for a sliding table saw, comprising a cross table frame, a horizontally lying first workpiece support surface, a stop rail fixed to the cross table frame above the first workpiece support surface and having a first vertically standing workpiece stop surface on a first side of the stop rail, which is arranged in such a way that a plate-shaped workpiece resting on the first workpiece support surface in a first support region arranged horizontally in front of the stop rail can be placed with a lateral edge against the first workpiece stop surface, a second vertically standing workpiece stop surface on a second side of the stop rail opposite the first side, the second workpiece stop surface being arranged in such a way that a plate-shaped workpiece resting on the first workpiece support surface in a second support region arranged horizontally behind the stop rail can be placed with a side edge against the second workpiece stop surface, characterised in that the first workpiece support surface is formed by a support surface of a support beam, and the support beam is arranged so as to be movable back and forth relative to the cross table frame.

A woodworking machine preferably extends from a front end to a rear end, wherein a feed or working direction is aligned from the front end to the rear end. A cross table disposed on the woodworking machine is typically moved relative to the woodworking machine in a feed direction to perform a machining operation, such as a saw cut, on a workpiece disposed on the cross table. In the intended use of the cross table, the first workpiece stop surface of the stop rail faces the front end of the woodworking machine. The first support region, which is arranged horizontally in front of the stop rail, is thus arranged between the stop rail and the front end of the woodworking machine in the feed direction. A workpiece arranged in the first support region and to be sawn is thus pressed by an operator in the feed direction against the first workpiece stop surface of the stop rail, whereas the horizontal component of the cutting force presses the workpiece away from the stop rail. The second workpiece stop surface of the stop rail faces the rear end of the woodworking machine in the intended use of the cross table. Consequently, the second support region arranged horizontally behind the fence rail is arranged between the fence rail and the rear end of the woodworking machine in the feed direction. A workpiece arranged in the second support region and at the second workpiece stop surface and to be sawn is thus pressed by an operator with the stop rail in the feed direction, whereas the horizontal component of the cutting force presses the workpiece against the stop rail.

The first workpiece support surface is formed by the support surface of the movable support beam. The support surface of the support beam is to be understood, in particular, as any part of the support beam which is suitable for supporting a workpiece in the intended operation of the cross table. The support surface may also be substantially linear in shape, for example, in that an edge of a support beam profile is directed vertically upwards. Preferably, the support beam is a hollow rectangular profile. In particular, it is preferred that the support beam is open at a vertically downwardly directed side of the support beam. For example, the support beam may have a beam-shaped and/or plate-shaped and/or tubular geometry and/or comprise or include rollers. The first support area and the second support area of the first workpiece support surface each preferably comprise at least two support points spaced apart from each other by at least 20 cm, preferably 30 cm, to enable a workpiece to be supported securely. These support points spaced apart from each other by 20 cm, preferably 30 cm, can, in particular, be formed by moving the support beam. In particular, two support beams may be provided. In this case, the first and second support regions of the first workpiece support surface each preferably comprise at least three support points spaced apart from one another by at least 20 cm, preferably 30 cm, in each case, the three support points not lying on a line but the distance of the first from the second support point being defined in a direction perpendicular to the direction of the distance of the second from the third support point.

The support beam is preferably movable independently of the stop rail in, preferably, at least one operating state. In particular, there is no mechanical or control coupling between the movement of the support beam and a pivoting of the stop rail. In an operating state, a movement of the stop rail preferably does not cause a movement or does not directly cause a movement of the support beam. In particular, a movement of the stop rail in this operating state does not cause a displacement of the support beam in a displacement direction of the support beam. Furthermore, in an operational state, a movement of the support beam does not cause a movement or a direct movement of the stop rail.

The support beam preferably extends in the longitudinal support beam direction from a front support beam end towards a rear support beam end. The front support beam end preferably faces away from the second workpiece support surface. The rear support beam end preferably faces away from the first workpiece support surface.

The support beam is arranged to be movable back and forth relative to the cross table frame, and thus also relative to the stop rail attached to the cross table frame. In particular, this means that the support beam is arranged to be displaceable relative to the stop rail so as to increase or decrease the size of the first support area relative to the second support area. The term displaceable is particularly understood as allowing movement in a substantially linear direction. Preferably, the support bar is substantially continuously displaceable relative to the stop rail. Substantially stepless means, in particular, that more than three, more than five, more than ten, or more than twenty different positions of the support beam relative to the stop rail are adjustable.

The fence rail can be pivotably and, if necessary, longitudinally displaceably fastened to the cross table frame along its direction of extension in order to carry out mitre cuts and to realise a dimensional correction at the fence flaps for such mitre cuts. Accordingly, the fence rail may be secured to the cross table frame by a pivot bearing having a vertical pivot axis. According to the invention, however, it is not necessary to provide two or more different positions for this pivot bearing on the cross table frame in order to move the stop rail between two different positions and thereby enable working in front of or behind the stop rail, because this is realized by moving the support beams.

It is preferred that the stop rail is stationary relative to a machine frame and/or relative to a sliding carriage during relative movement of the support beam. The support beam being reciprocally movable relative to the stop rail allows the distance of the front support beam end and the rear support beam end to the stop rail to be variable, i.e., to be increased and decreased. In particular, this is achieved, according to the invention, without having to move the stop rail. For example, the stop rail can be arranged on the cross table so as not to be displaceable. In particular, the support beam is arranged in such a way that it is arranged in a horizontally tilt-resistant manner.

The cross table preferably extends from a front cross table end to a rear cross table end. The first workpiece stop surface preferably faces the front cross table end. Preferably, the second workpiece stop surface faces the rear cross table end. It is preferred that a front distance between the first workpiece stop surface and the front cross table end substantially corresponds to a rear distance between the second workpiece stop surface and the rear cross table end. In particular, here, substantially means that the ratio of the front distance to the rear distance is between 0.5 and 1.5, preferably between 0.75 and 1.25, more preferably between 0.9 and 1.1. Consequently, the stop rail is preferably arranged centrally on the cross table and extends from the outer end of the cross table to the inner end of the cross table facing the machining tool.

According to the invention, it is not necessary to move the stop rail from the rear edge of the cross table to the front edge of the cross table and vice versa in order to switch between placing the workpiece in front of the stop rail and behind the stop rail. Instead, depending on whether a workpiece is to be placed in front of or behind the stop rail, the first workpiece support surface of the cross table can be enlarged in front of or behind the stop rail. This adjustment of the first workpiece support surface to the requirements of an operator can be accomplished simply by moving the support beam relative to the stop rail. Moving the support beam can be accomplished in a fraction of the time required to relocate a stop rail. The time advantage thus gained can be used productively, so that the number of workpieces to be machined per unit of time can be increased. The cross table according to the invention is also characterized by a lower weight. The avoidance of transferability results in a lower number of batch parts.

In a preferred embodiment, it is provided that the support beam is movable back and forth between a first position, in which the support surface of the support beam is arranged substantially horizontally in front of the stop rail and forms or supplements the first support area, and a second position, in which the support surface of the support beam is arranged substantially horizontally behind the stop rail and forms or supplements the second support area.

The support beam is reciprocally movable between the first position and the second position. By moving the support beam back and forth between the first position and the second position, the size of the first workpiece support surface in front of and behind the stop rail can be changed. In the first position, the first workpiece support surface formed by the support beam support surface is disposed substantially in front of the stop rail so that a workpiece can be deposited in the first support area and placed against the first workpiece stop surface. In this position, during operation of the cross-cut table on a woodworking machine, an operator presses the workpiece against the stop rail, whereas the horizontal cutting force of the circular saw blade pushes the workpiece away from the stop rail. In the second position, the first workpiece support surface formed by the support beam support surface is disposed substantially behind the stop rail so that a workpiece can be deposited in the second support area and placed against the second workpiece stop surface. In operation of the cross table on a woodworking machine, in this position an operator pushes the workpiece by means of the stop rail in the feed direction and the horizontal component of the cutting force of the circular saw blade pushes the workpiece against the stop rail.

In particular, substantially horizontally in front of or behind the stop rail may mean that in the first position more than 50%, more than 60%, more than 70%, more than 80% or more than 90% of the total supporting surface of the support beam is arranged in front of or behind the stop rail. Further, substantially horizontally in front of or behind the stop rail may mean that in the first position more than 50%, more than 60%, more than 70%, more than 80% or more than 90% of the support beam longitudinal extension is arranged in front of or behind the stop rail, respectively. In particular, in the first position, the first workpiece stop surface faces the greater part of the first workpiece support surface.

For example, the support beam may be pivotable or linearly displaceable parallel to the longitudinal extent of the support beam. Furthermore, the support beam may also be displaceable in a direction transverse to the longitudinal extent of the support beam. For example, it may be preferred that the support beam is displaceably arranged in a direction parallel to the main extension direction of the stop rail in order to adapt the first workpiece support surface to a workpiece size.

Furthermore, the support beam may also be moved to an intermediate position between the first position and the second position if an operator finds this advantageous. This provides the additional benefit that the available support surface for a workpiece does not reduce when an angle is set. A stable and secure support of the workpiece on the cross table is thus achieved both for the cutting guide in front of the angle stop and for the cutting guide behind the angle stop.

A further preferred embodiment comprises a guide element configured to guide the support beam in a horizontal direction, preferably wherein the guide element is arranged on the stop rail. For example, the guide element may act as a support such that the guide element can support at least one vertical force. Furthermore, it may be preferred that the guide element can also absorb forces in the horizontal direction, for example, to form a linear guide for the support beam. Preferably, the guide element also absorbs torques that may be generated in particular by the unilateral loading of the support beam in the first position and in the second position. By means of a torque-absorbing guide element, the support beam can be arranged in a tilt-resistant manner.

In a further preferred embodiment, it is provided that the cross table comprises a first coupling element for coupling the cross table to a woodworking machine, in particular, a sliding carriage of a woodworking machine, wherein the first coupling element is preferably horizontally guidable on the woodworking machine or on a sliding carriage rail of the sliding carriage and further preferably comprises at least one clamping element for fixing the first coupling element to the sliding carriage rail. The first coupling element allows a relative movement of the cross table on the sliding carriage. As a result, large workpieces can be advantageously machined with a woodworking machine using the cross table.

In a further preferred embodiment, it is provided that the cross table is configured as a parallelogram cross table. In particular, it is preferred that the cross table, and, in particular, the cross table configured as a parallelogram cross table, has a first transverse frame element and a second transverse frame element, which are arranged parallel to one another, are arranged horizontally spaced apart from one another, and are coupled to one another such that they can be displaced parallel to one another, in that the first and second transverse frame elements are connected to one another in an articulated manner via a longitudinal frame element.

The first cross frame element and the second cross frame element preferably each extend from a first end to a second end. The first ends may be spaced apart by a frame width. Preferably, the second ends are also spaced apart by the frame width. For example, the cross frame elements may be rotatably arrangeable with their first ends on a sliding carriage. Further preferably, the transverse frame elements are arranged with their first ends on the first coupling element, in particular, rotatably arranged. Furthermore preferably, the second ends of the transverse frame elements may be arranged on a second coupling element, preferably pivotally arranged. The pivotable arrangement of the first ends and the second ends is preferably such that a vertical axis of rotation is formed in each case. The pivotable arrangement of the first ends and the second ends of the transverse frame elements results in the formation of a parallelogram cross table, which is pivotable about a vertical table pivot axis. The arrangement of the first ends and the second ends on the sliding carriage, the first coupling element, and/or the second coupling element explained in the foregoing is to be understood, in particular, in such a way that the transverse frame elements are arranged with regions adjacent to the first ends and to the second ends on the sliding carriage, the first coupling element and/or the second coupling element.

The stop rail preferably extends substantially parallel to the first transverse frame element and to the second transverse frame element. Preferably, the stop rail has a substantially equal distance from the first transverse frame element and the second transverse frame element. It is preferred that the distance from the first transverse frame element to the first workpiece stop surface and the distance from the second transverse frame element to the second workpiece stop surface are substantially equal. In particular, substantially means here that the ratio of these distances is between 0.5 and 1.5, preferably between 0.75 and 1.25, more preferably between 0.9 and 1.1. Consequently, the stop rail is located substantially centrally between the two transverse frame elements.

Preferably, the first transverse frame element and the longitudinal frame element are interconnected by an angular adjustment unit, wherein the angular adjustment unit is arranged to cause pivoting of the first transverse frame element relative to the longitudinal frame element and parallel displacement of the first transverse frame element relative to the second transverse frame element, and the at least one support beam is vertically supported by the first and second transverse frame elements.

For example, the angle adjustment unit may be attached to a first engagement point of the first transverse frame element and to a second engagement point of the second transverse frame element, wherein the angle adjustment unit is configured to extend and retract. This allows the angular adjustment unit to increase and decrease the spacing between the first engagement point and the second engagement point. Due to the parallel displaceability of the transverse frame elements, a parallel displacement can be effected by increasing or decreasing the spacing between the first engagement point and the second engagement point. Consequently, when the cross frame elements are rotatably arranged on a sliding carriage, a pivoting of the cross frame elements and thus of the cross table about a vertical table pivot axis relative to the sliding carriage may be effected. The angle adjustment unit may further comprise a drive for motorized adjustment of the angle between the cross table, in particular, the stop rail, and the direction of travel of the sliding carriage and/or a saw line. Particularly preferably, the motorized adjustment is of the electric motor type. In addition, or alternatively, the angle adjustment unit can be operated manually.

In particular, it is preferred that the angle adjustment unit comprises a fine angle adjustment. With the fine angle adjustment, an operator can set a precise mitre angle. In particular, the angle fine adjustment is coupled to the angle adjustment unit so that a defined parallel displacement of the cross frame elements can be performed with the angle fine adjustment. For this purpose, the angle fine adjustment unit may comprise, for example, a rotary knob. The angular fine adjustment can preferably be used to set an angular accuracy relative to a direction of travel of the sliding carriage of less than $\frac{1}{25}$, less than $\frac{1}{50}$ degrees of arc, in particular, less than $\frac{1}{100}$ degrees of arc.

The cross table further preferably comprises an angle sensor system for detecting a set angle between the cross table, in particular, the stop rail, and a travel direction of a sliding carriage and/or a saw line. The angle sensor system may detect this angle incrementally, for example. For this purpose, the angle fine adjustment comprises, for example, an incremental encoder. In addition, the angle sensor system can also be designed in such a way that it detects the angle absolutely.

Further, the angle adjustment unit may comprise an index bolt for fixing the cross table and/or the fence rail, wherein the index bolt cooperates with the fence rail such that the first workpiece stop surface and the second workpiece stop surface may include defined angular positions, for example a 90° angle with a saw line formed by a circular saw blade of a woodworking machine. Preferably, the index bolt has a longitudinal bolt axis, wherein the longitudinal bolt axis is preferably oriented horizontally.

Preferably, the stop rail may be arranged, preferably guided, on the first transverse frame element and/or on the second transverse frame element. Preferably, the stop bar is spaced apart from the transverse frame elements in a vertical direction and/or in a horizontal direction, wherein the stop bar can be arranged, in particular, in a vertical direction above the transverse frame elements. Preferably, this vertical spacing corresponds substantially to the height of the support beam. The support beam may rest on the first transverse frame element and/or on the second transverse frame element and pass under the stop rail. Preferably, the stop rail is arranged between the transverse frame elements in the horizontal direction. It is further preferred that the guide element is arranged on the first transverse frame element and/or on the second transverse frame element.

According to a further preferred embodiment of the cross table, the cross table comprises two or more support beams, wherein the two or more support beams are horizontally spaced apart. The two or more support beams may be of the same or different design. For example, they may differ in terms of their longitudinal support beam dimension. It is preferred that a first support beam is arranged in an area facing a sliding carriage in intended operation, and a second support beam is arranged in an area facing away from the sliding carriage in intended operation.

Furthermore, it is preferred that at least one support beam is movable in more than one horizontal direction. This has the advantage that the support beam can be adapted to individual support situations for workpieces. In particular, smaller workpieces can thus also be arranged on the support surface of the support beam.

A further preferred embodiment of the cross table provides that it comprises a cranking element, wherein the cranking element is arranged with a first cranking end at an area adjacent to a cross table end and a second cranking end is spaced from the cross table end. The first crank end is preferably arranged at the cross table end facing away from a sliding carriage in intended operation. In particular, the second crank end is arranged and configured such that it can be coupled to a telescopic arm of a woodworking machine for supporting the cross table. The maximum possible cutting length is increased by a crank element formed in this way.

In addition, the cross table may comprise a stop flap mounted for movement along the stop rail and having a vertically positioned stop flap surface oriented perpendicular to the first and/or second workpiece stop surface. Furthermore, it may be provided that the stop flap is adjustable between two flap positions and is arranged in a first flap position above the first support area and is arranged in a second flap position above the second support area, wherein preferably the stop flap is arranged to be foldable about a substantially horizontal axis between the two flap positions.

On the one hand, the stop flap may be used when a workpiece is positioned against the first workpiece stop surface, and on the other hand, the stop flap may also be used when a workpiece is positioned against the second workpiece stop surface of the stop rail. It is further preferred that the stop rail comprises a stop flap pivot actuator, the stop flap pivot actuator being arranged and configured to move the stop flap between the first flap position and the second flap position.

Furthermore, the stop flap pivot actuator may be arranged and configured to move the stop flap into a traverse position, wherein the traverse position is arranged between the first flap position and the second flap position, and preferably the stop flap is oriented vertically, in particular, upwardly, in the traverse position. In particular, this means that the stop flap does not abut against either the first workpiece support surface or the second workpiece support surface. Preferably, the stop flap pivot actuator is arranged to move the stop flap into the traverse position before each movement along the stop rail. This allows a higher speed of movement along the stop rail to be set, as the crushing hazards explained below are reduced.

Powered flap stops pose a risk of crushing injuries to an operator. Such a crushing hazard can be reduced or avoided by moving the stop flap to the traverse position during traverse. Since the traverse position is between the first flap position and the second flap position, there is generally a sufficient distance between the stop flap and other components of the cross table. This spacing reduces the risk of crushing injury to an operator.

According to a further aspect, the above-mentioned problem is solved by a woodworking machine, in particular, a sliding table saw, comprising a cross table according to one of the embodiments described in the foregoing, which is mounted on a machine frame so as to be movable along a working direction relative to a tool.

Preferably, the woodworking machine comprises a workpiece support table above the machine frame. Furthermore, the woodworking machine may comprise a tool, such as a circular saw blade, having a circumferential portion protruding from a saw slot arranged in the workpiece support table. The circular saw blade, by its horizontal diametrical blade extension at the level of the workpiece support table, forms a horizontal saw line extending in the working direction.

Preferably, the woodworking machine comprises a sliding carriage linearly movable relative to the machine frame, the cross table being arranged on the sliding carriage. Preferably, the sliding carriage is movable relative to the frame in the feed direction and in the opposite direction parallel to the saw line.

The cross table is preferably arranged on the sliding carriage in such a way that it cantilevers at a 90° angle to the saw line. Preferably, the fence rail is arranged with its rail longitudinal extension at a 90° angle to the saw line. With such a woodworking machine, saw cuts can be made which are aligned at a 90° angle to the workpiece side arranged on the fence rail.

In a further preferred embodiment of the woodworking machine, it is provided that the cross table is arranged on the sliding carriage so as to be pivotable about a substantially vertical table pivot axis. With such a woodworking machine, the production of mitre cuts on workpieces is possible. This is made possible by the fact that the stop rail arranged on the cross table, and, in particular, the first and the second workpiece stop surfaces, can assume an angle other than 90° with respect to the saw line. Due to the pivotable arrangement of the cross table on the sliding carriage, the cantilever direction of the cross table can be changed.

In a further preferred embodiment, it is provided that the cross table is configured as a parallelogram cross table and is arranged on the sliding carriage so as to be pivotable about the substantially vertical table pivot axis, the cross table preferably being secured to the sliding carriage by means of two pivot joints.

In a further preferred embodiment, it is provided that the cross table is arranged on the sliding carriage by means of a first coupling element, and the first coupling element is arranged on the sliding carriage so as to be movable parallel to the working direction or sawing line, wherein preferably the first coupling element is guided on a sliding carriage rail and further preferably at least one clamping element is arranged on the first coupling element, which is designed to fix the first coupling element to the sliding carriage rail. The sliding carriage rail and the first coupling element are further preferably configured such that, in the released state of the clamping element, substantially only a movement parallel to the saw line is possible. In particular, the cross table remains substantially the same in its vertical orientation even in the released state of the clamping element.

In a further preferred embodiment, it is provided that the sliding carriage has a second workpiece support surface arranged in alignment with the first workpiece support surface for supporting a workpiece, and the stop rail is arranged so as to be pivotable about a vertical stop rail axis.

Furthermore, it is preferred that the woodworking machine is further formed by a detection device comprising a flap sensor to detect the first flap position and the second flap position and preferably the travel position of the stop flap, and/or a workpiece sensor to detect a workpiece at the first workpiece stop surface and/or the second workpiece stop surface. For example, the flap sensor may be a position sensor on the stop flap. Furthermore, the flap sensor may be configured as a camera, wherein the first flap position and the second flap position are preferably detected by means of an image evaluation unit.

By means of the detection of whether a workpiece is arranged on the first workpiece stop surface or on the second workpiece stop surface, there is the possibility of automatic length compensation. The workpiece sensor can be designed, for example, as a light barrier or as a capacitive sensor. Furthermore, it is preferred that the stop rail comprises a spring-mounted section and a position sensing device. In particular, it is preferred that the resiliently supported section is arranged on the first workpiece contact surface or on the second workpiece contact surface. The first workpiece support surface and the second workpiece support surface may also each comprise a resiliently supported section. The resiliently supported section is preferably coupled to the position sensing device. When a workpiece is in contact with the spring-mounted section, the position sensing device can be used to detect the contact of the workpiece and to process it in terms of signals.

In another preferred embodiment of the woodworking machine, the woodworking machine is provided with a first control unit for controlling the stop flap pivot actuator, the first control unit being arranged to receive a workpiece position signal from the detection device, the workpiece position signal characterizing a positioning of a workpiece at the first workpiece stop surface or at the second workpiece stop surface, and the first control unit being further arranged to generate a first flap control signal when the workpiece position signal characterizes a workpiece position at the first workpiece stop surface, and to generate a second flap control signal when the workpiece position signal characterizes a workpiece position at the second workpiece stop surface, wherein the flap pivot actuator is arranged to position the flap in the first flap position when the first flap control signal is received and in the second flap position when the second flap control signal is received.

Swivelling the fence rail around the table swivel axis changes the distance of any point on the first or second workpiece fence surface from the saw line formed by a circular saw blade, also called the soul axis. The length information provided by the fence rail ruler therefore requires length correction. When tilting, the length correction must therefore usually be included in order to maintain the required dimensions from the saw line to the fence ruler and/or to the fence flaps in order to produce dimensionally accurate workpieces. The reference can be, for example, the table height and a point to the side of the saw blade flange. The workpiece thickness can also be taken into account, since the top and bottom dimensions can be assumed here.

The length correction can be carried out, for example, by manually moving the stop rail in the longitudinal direction of the rail, as this also longitudinally displaces the ruler which is usually arranged on the stop rail. For each adjustable angle, a value for the required length correction is preferably provided. For example, the woodworking machine may comprise a second control unit which calculates the required length correction taking into account an adjusted angle of the fence rail relative to the saw line. This angle may, for example, be provided by the angle sensor system. Preferably, the woodworking machine comprises a length correction indicator which indicates to an operator a deviation from the correct value of the length correction.

The displaceability of the fence rail in the longitudinal direction of the rail involves the risk that the fence ruler intersects the saw line when the swivel angle is changed, thus creating a risk of collision with the circular saw blade. Preferably, the second control unit is arranged to detect such a risk of collision. For example, the second control unit may be arranged to calculate cutting with the saw line as a function of the pivot angle and the position of the stop ruler in the longitudinal direction of the rail.

In a further preferred embodiment, it is provided that the woodworking machine comprises a circular saw blade and a rail actuator moving the fence rail in the longitudinal direction of the rail, and the second control unit is arranged to determine a distance between the end of the fence rail facing the sliding carriage and the circular saw blade, and to control the rail actuator such that contact between the fence rail and the circular saw blade is prevented.

According to a further aspect, the above-mentioned task is solved by a method for controlling a woodworking machine, in particular, a sliding table saw, having a cross-cut table which has a stop rail with a stop flap, comprising generating a workpiece position signal, wherein the workpiece position signal characterizes a positioning of a workpiece at a first workpiece stop surface or at a second workpiece stop surface of the fence rail arranged opposite the first, generating a first flap control signal when the workpiece position signal characterizes a workpiece position at the first workpiece stop surface or generating a second flap control signal when the workpiece position signal characterizes a workpiece position at the second workpiece stop surface, and positioning the stop flap in a first flap position on a first side of the stop rail when the first flap control signal is generated and in a second flap position on a second side of the stop surface opposite the first side, when the second flap control signal is generated, the stop flap preferably being in a traverse position when traversing along the stop rail, the traverse position being between the first flap position and the second flap position.

It is further preferred that the method comprises the steps of: Detecting a pivot angle of the stop ruler relative to a saw line formed by a circular saw blade, for example, by means of an angle sensor system, in particular, an angle transducer, and determining a length correction and/or determining a risk of collision of the stop ruler with the circular saw blade.

The method according to the invention and its possible further developments have features or method steps which make them particularly suitable for use for a cross table according to the invention and its further developments. For further advantages, embodiment variants, and embodiment details of these further aspects and their possible further embodiments, reference is also made to the description given previously with respect to the corresponding features and further embodiments of the cross table.

BRIEF DESCRIPTION OF THE DRAWINGS

Preferred embodiments are explained with reference to the accompanying figures. They show.

DETAILED DESCRIPTION OF THE EMBODIMENTS

In the Figures, identical or substantially functionally identical or similar elements are designated with the same reference signs.

Figure 1:
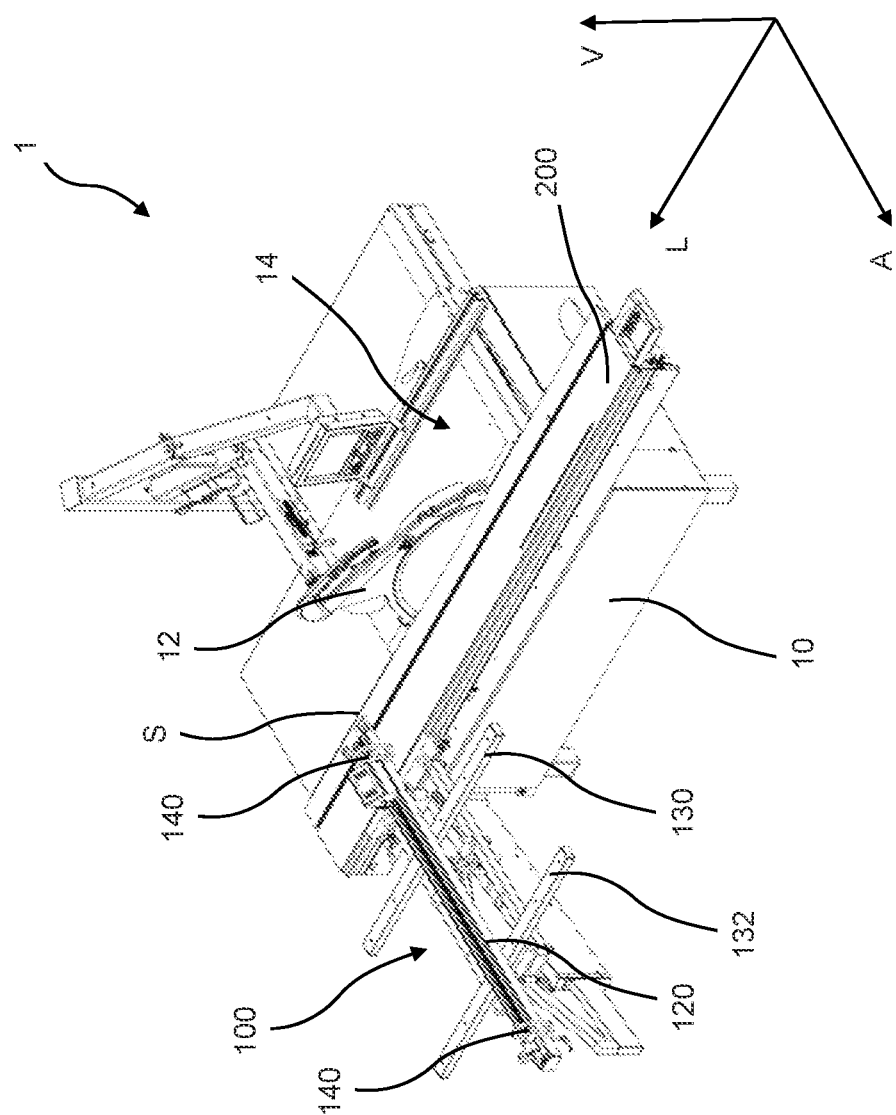
FIG. 1 is a perspective view of a woodworking machine equipped with a cross table according to the invention.

FIG. 1 shows a perspective view of a woodworking machine 1 equipped with a cross-cut table 100 according to the invention. The woodworking machine 1, which is in the form of a sliding table saw, has a base frame 10 and a sliding carriage 200 which is guided linearly on the base frame 10 and can be displaced horizontally in the direction L. A cross table 100 projecting in the direction A is arranged on the sliding carriage 200, the workpiece support surface of which cross table 100 is substantially formed by support beams 130, 132 movable back and forth in the direction L. The cross table 100 is pivotable relative to the sliding carriage 200 about a substantially vertical axis in the direction V. The sawing line S is formed by a circular saw blade hidden under the protective hood 12, which preferably protrudes from the second workpiece support surface through a sawing slot. The sawing line S is oriented substantially parallel to the direction of travel of the carriage 200.

Figure 2:
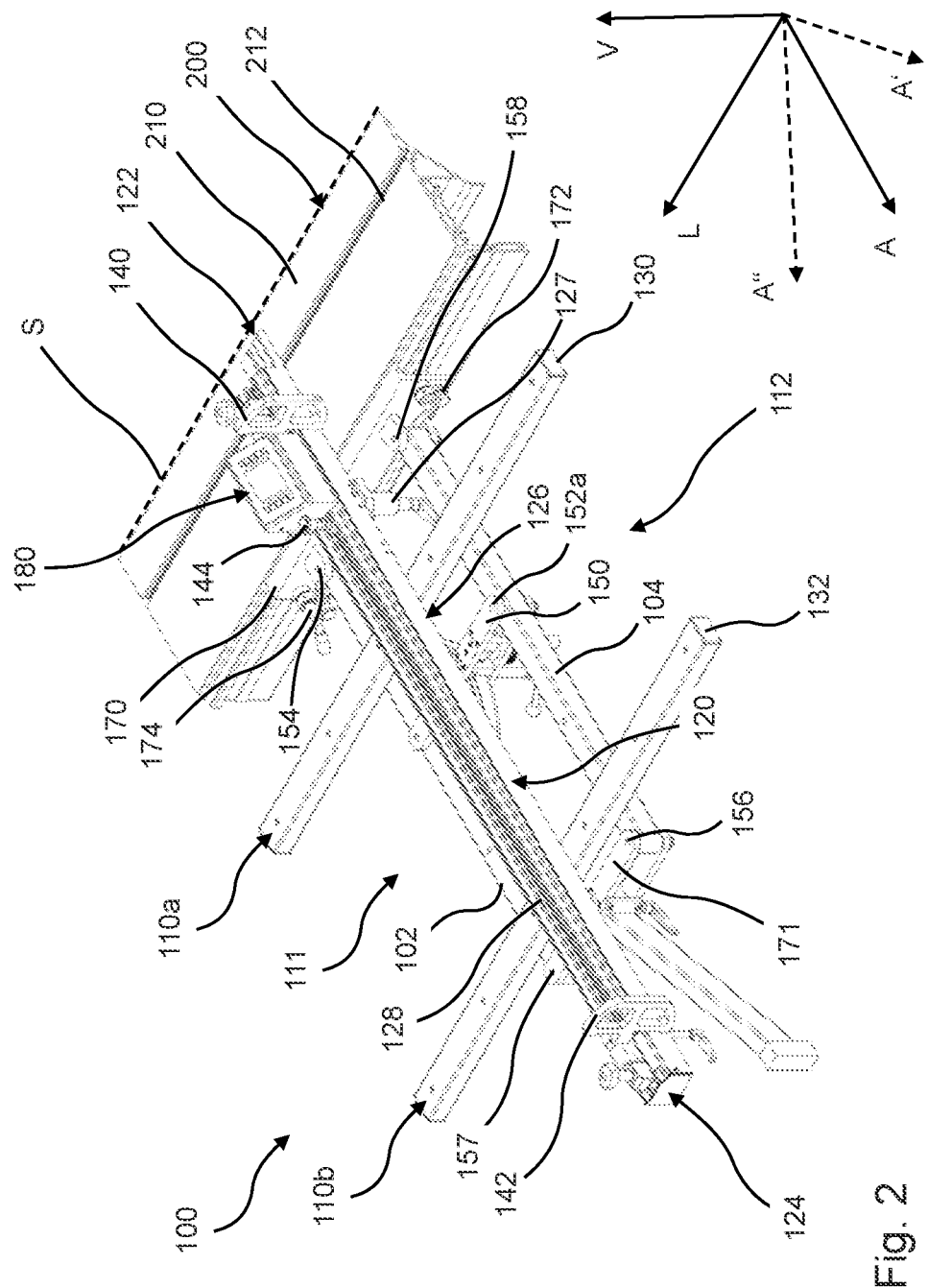
FIG. 2 is a perspective view of a sliding carriage equipped with a cross table according to the invention.

FIG. 2 shows a perspective view of the sliding carriage 200 shown in FIG. 1 with the cross table 100 according to the invention. The cross table 100 is arranged on the sliding carriage 200. The cross table 100 extends in the cantilever direction A from a first cross table end facing the sliding carriage 200 to a second cross table end facing away from the sliding carriage 200.

The cross table 100 is configured as a parallelogram cross table, which is pivotally arranged on the sliding carriage 200 about a substantially vertical axis. The cross table 100 comprises a cross table frame formed by, among other things, a first cross frame element 102 and a second cross frame element 104 arranged parallel thereto, a first coupling member 170 and a second coupling member 171. The first transverse frame element 102 and the second transverse frame element 104 each have a support beam longitudinal extension oriented parallel to the cantilever direction A, which is oriented orthogonally to a beam cross section. The first transverse frame element 102 has its supporting beam longitudinal extent substantially parallel to the second transverse frame element 104. The first transverse frame element 102 is spaced apart from the second transverse frame element 104 in the longitudinal direction L.

The cross frame elements 102, 104 are rotatably connected to the first coupling element 170 about a vertical axis at their ends facing the sliding carriage 200. The vertical axis is marked V in FIG. 2. This connection is realized by a swivel joint 154, 158. The transverse frame elements 102, 104 are also connected to the second coupling member 171 at a region adjacent to the second cross table end by means of pivot joints 156, 157. By means of the pivot joints 154, 156, 157, 158, a parallelogram cross table is formed. The cantilever direction A of the cross table 100 is thus variable relative to the saw line S, so that, for example, the cantilever directions A' and A" can also be adjusted.

The cross table 100 further comprises a stop rail 120. The stop rail 120 extends in the cantilever direction A from a first rail end 122 to a second rail end 124. The first rail end 122 faces the sliding carriage 200. The second rail end 124 faces away from the sliding carriage 200. Between the first rail end 122 and the second rail end 124, the stop rail 120 extends in a longitudinal rail direction. The longitudinal rail direction is oriented substantially parallel to the main extension directions of the cross frame elements 102, 104.

The stop rail 120 is movably coupled to the first coupling member 170 and the second coupling member 171 in the longitudinal direction of the rail. The stop rail 120 further includes, in a region adjacent the first rail end 122, a vertically downwardly projecting pin that engages a sliding carriage groove 212. The first coupling member 170 is coupled to the sliding carriage 200 by a first clamping device 172 and a third clamping device 174, the clamping devices 172, 174 providing a fixation in the longitudinal direction L.

The cross table 100 includes a first workpiece support surface. The first workpiece support surface is formed by a support surface 110a of a first support beam 130 and by a support surface 110b of a second support beam 132. The support beams 130, 132 are mounted for displacement in the longitudinal direction L. Preferably, the support beams 130, 132 can also be moved in the cantilever directions A, A', A". In particular, it is preferred that the second support beam 132 is arranged to be movable only in the longitudinal direction L and that the first support beam 130 is arranged to be movable in the longitudinal direction L and in the cantilever directions A, A', A".

By allowing the support beam 130 and the support beam 132 to move in the longitudinal direction L, the workpiece support surface of the cross table 100 may be formed substantially on the first side 111 or on the second side 112. Depending on whether a workpiece is arranged on the first workpiece support surface or on the second workpiece support surface 126 arranged opposite thereto, the first support beam 130 and the second support beam 132 can be moved to the side 111, 112 on which the workpiece is to be arranged.

The cross table 100, which is designed as a parallelogram cross table, has an angle adjustment unit 150. By means of the angle adjustment unit 150, a defined angle between the cantilever direction of the cross table 100 and the saw line S can be set. The angle adjustment unit 150 is also attached to the cross table frame by swivel joints 152a, 152b.

A second clamping device 127 is provided for allowing the length compensation to be fixed. Furthermore, the stop rail 120 comprises a first stop flap 140 and a second stop flap 142. The stop flaps 140, 142 are fixable to the stop rail by means of locking pins 144. The stop flaps 140, 142 are in a second flap position. Furthermore, the stop rail 120 comprises a control unit 180.

FIGS. 3a-3d show a perspective view of a sliding carriage equipped with a further cross table according to the invention. The cross table 100' differs essentially from the cross table 100 described in the foregoing in that it has motor-adjustable stop flaps 140', 142'. The stop flap 142' comprises a flap pivoting actuator 143 and a pull-out 145. The stop flaps 140', 142' are preferably both movable along the stop rail 120 by a flap pivot actuator.

Figure 3A:
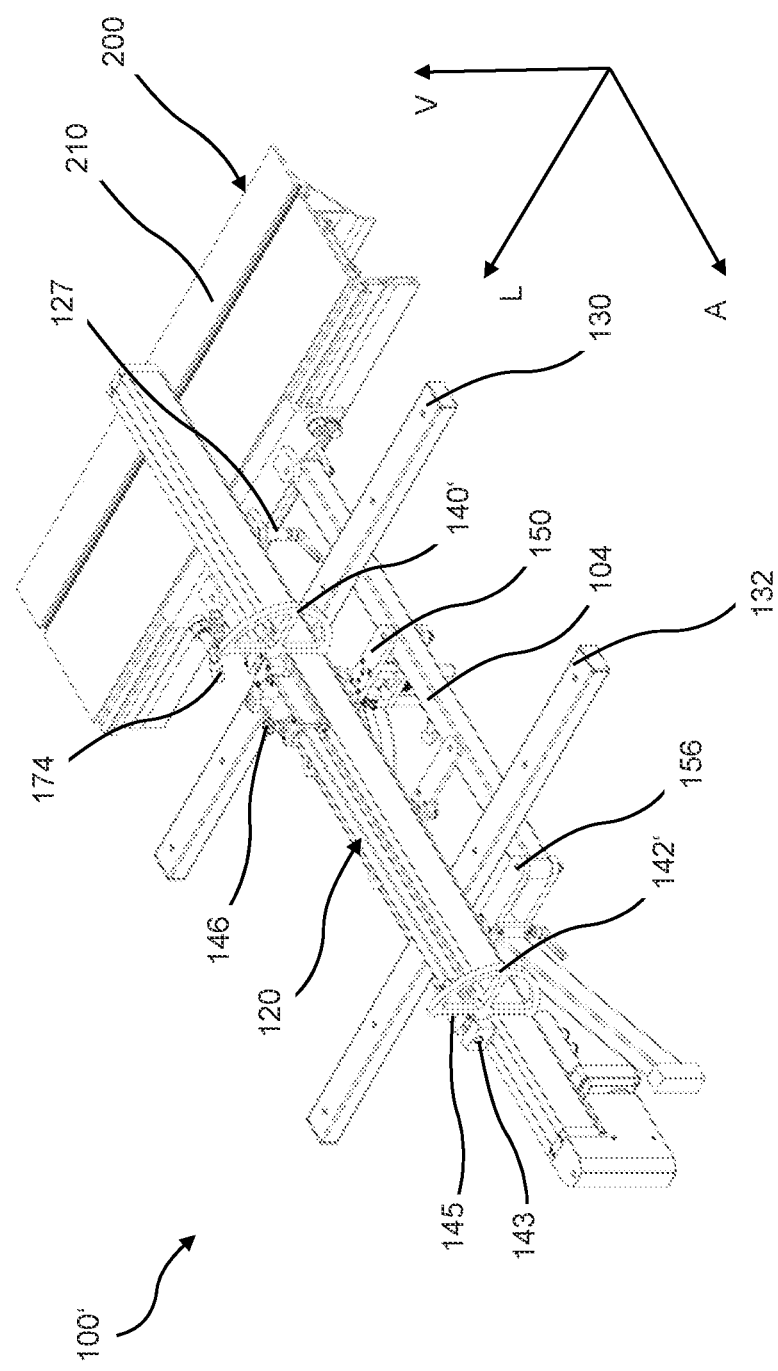
FIGS. 3a-3d are perspective views of a sliding carriage equipped with a further cross table according to the invention.
Figure 3B:
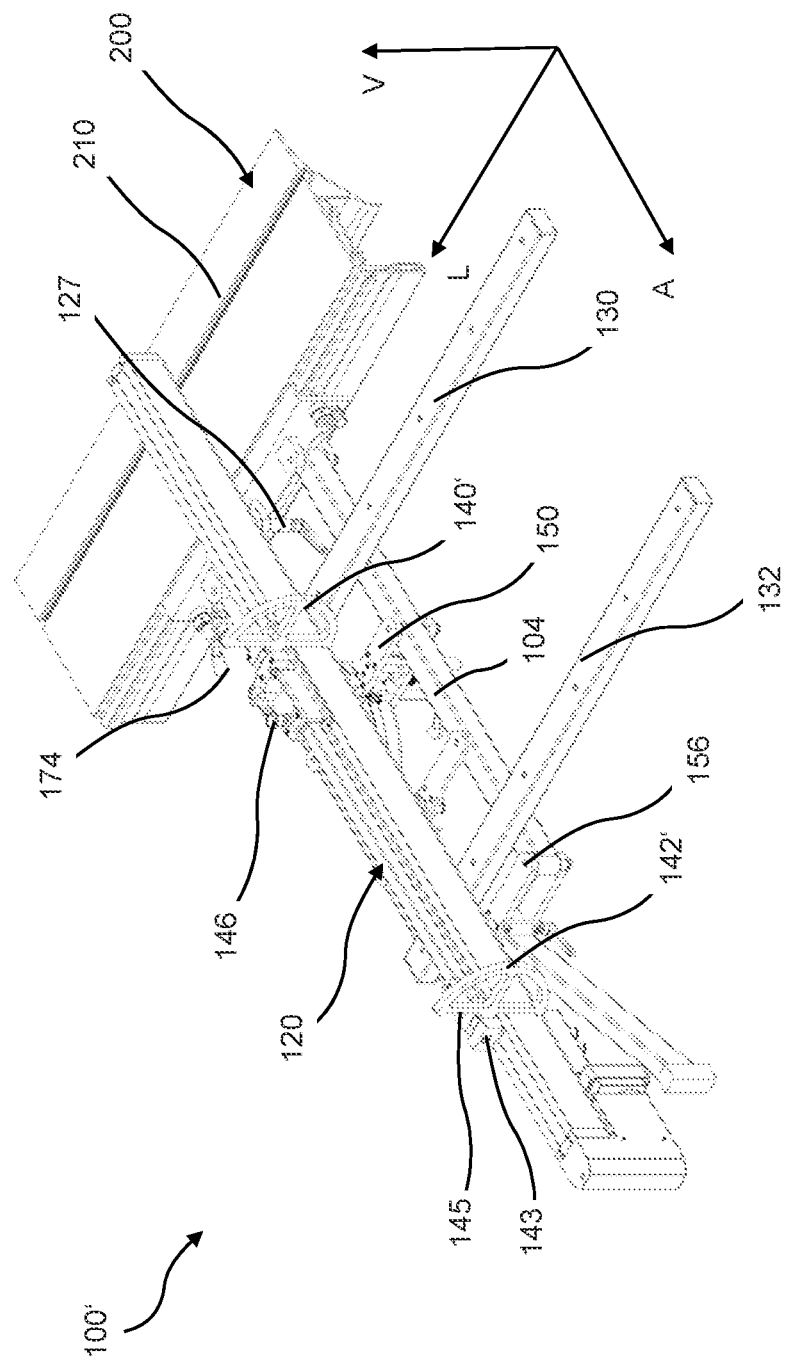

FIG. 3b shows the support beams 130, 132 in a first position in which the support surfaces of the support beams 130, 132 are arranged substantially horizontally in front of the stop rail 120 and form a first support area. A workpiece can thus be placed in front of the support rail 120. In this position, the workpiece is pushed against the stop rail 120 by an operator and thus moved relative to a circular saw blade.

Figure 3C:
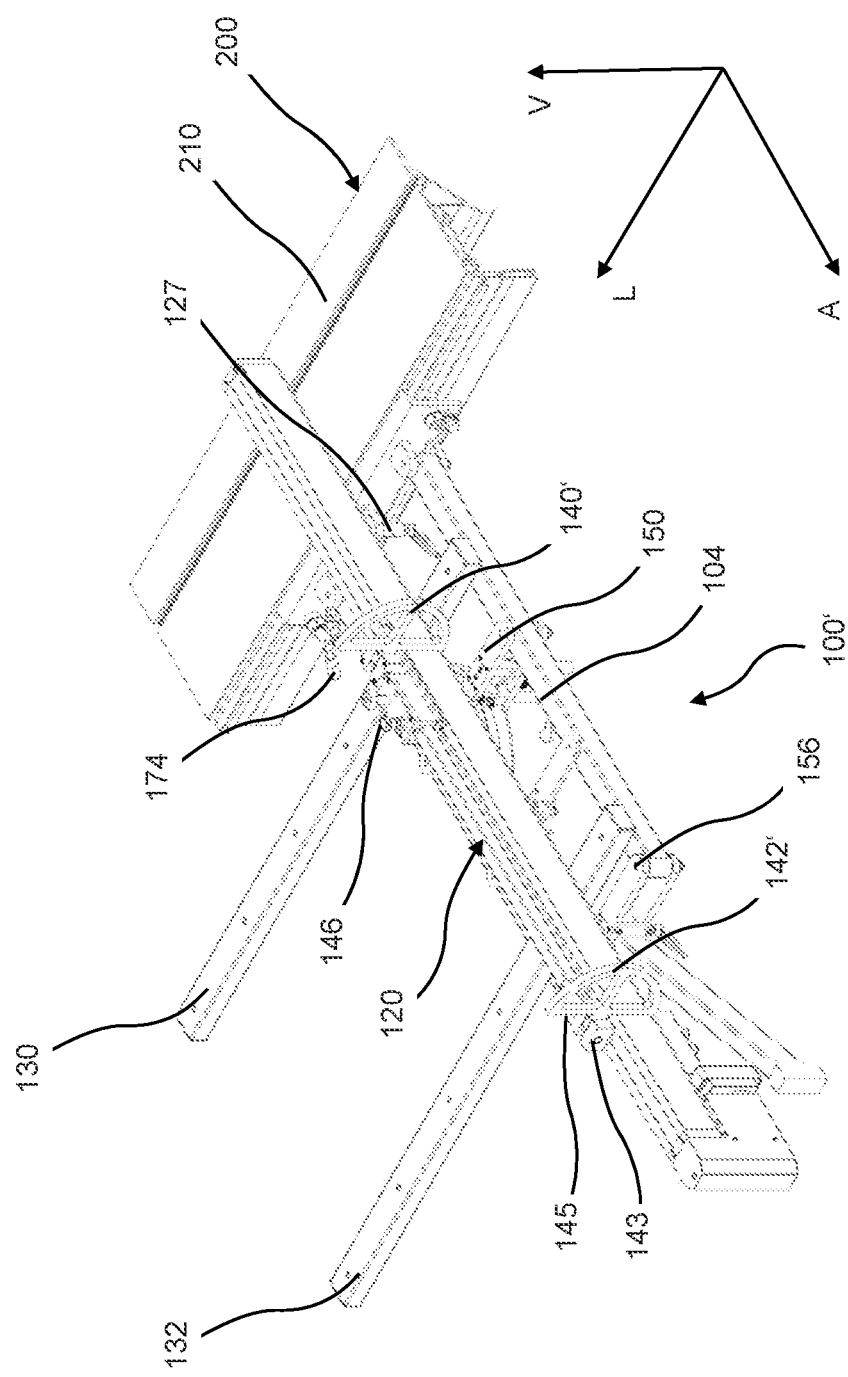
Figure 3D:
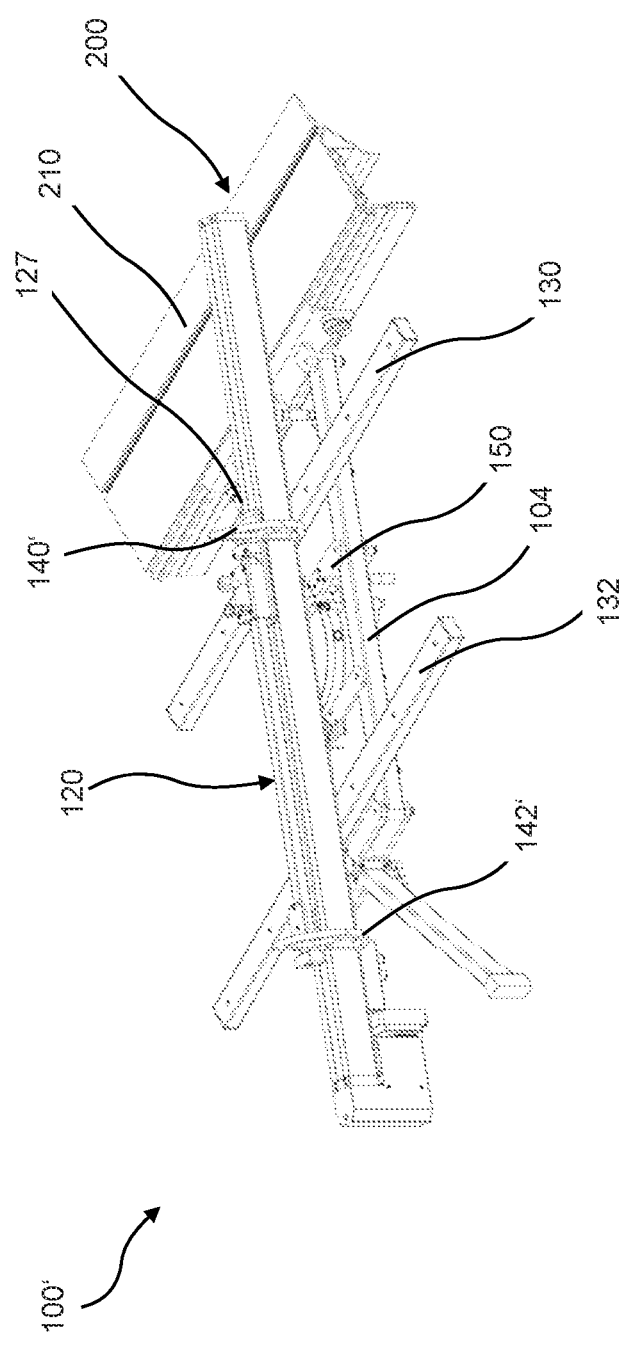

In FIG. 3c, the support beams 130, 132 are in a second position in which the support surfaces of the support beams 130, 132 are arranged substantially horizontally behind the stop rail 120 and form a second support area. A workpiece can thus be placed behind the support rail in a particularly preferred manner and pushed by an operator using the stop rail 120.

In the prior art, in order to change from machining in front of the rail to machining behind the rail, it is necessary to dismantle the stop rail and reattach it at another position of the cross table, whereupon calibration is still required. In the case of the cross table 100', this is done by moving the support beams 130, 132 in the longitudinal direction L. In particular, this does not require calibration of the stop rail 120.

Figure 4:
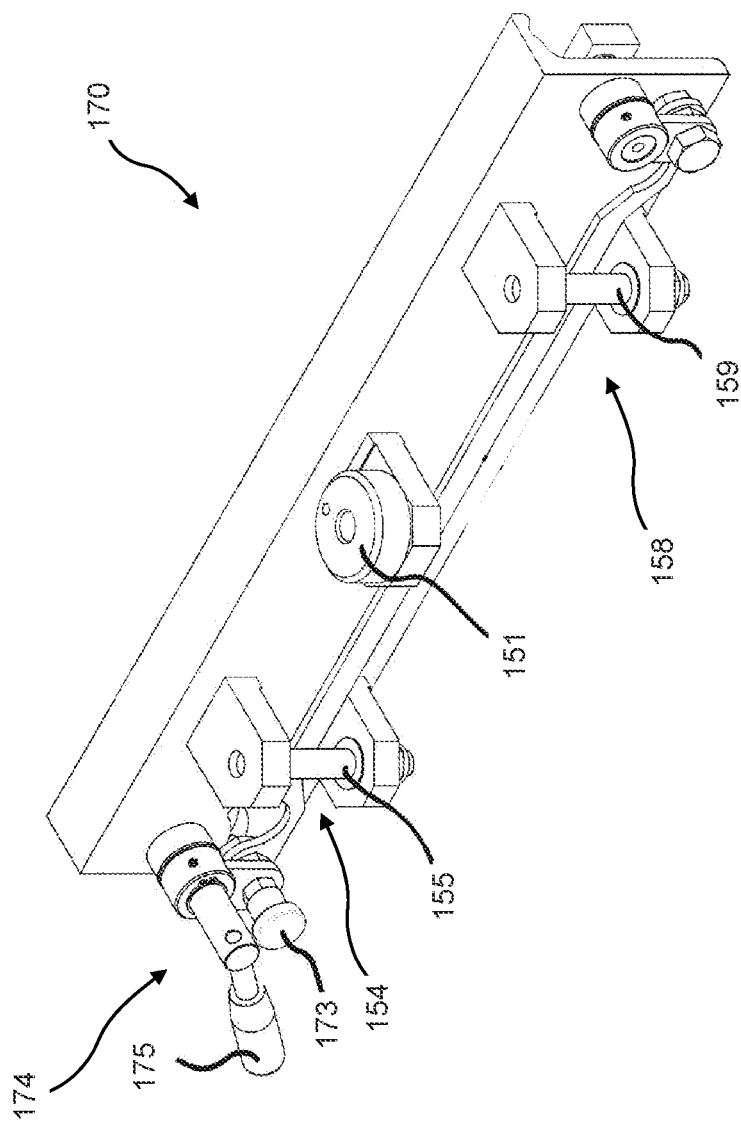
FIG. 4 is a perspective view of a coupling element.

FIG. 4 shows a perspective view of a coupling element. The first coupling element 170 comprises pivot joints 154, 158 as described above. The swivel joints 154, 158 form a pin connection with the cross table 100, 100'. For this purpose, bolts 155, 159 are provided at the pivot joints 154, 158. Furthermore, the first coupling element 170 comprises a receptacle 151 for the stop rail. The third clamping device 174 comprises a lever 175 for releasing and for locking the third clamping device 174. Furthermore, the clamping device comprises a locking pin 173 for locking the clamping device 174.

The first clamping device 172 and the third clamping device 174 may be coupled to each other. In particular, it is preferred that the lever 175 can be used to release and lock the third clamping device 174 and the first clamping device 172. Similarly, it is preferred that the lever of the first clamping device 172 can be used to release and lock the third clamping device 174 and the first clamping device 172. As a result, a unilateral release of both clamping devices 172, 174 is possible.

Figure 5:
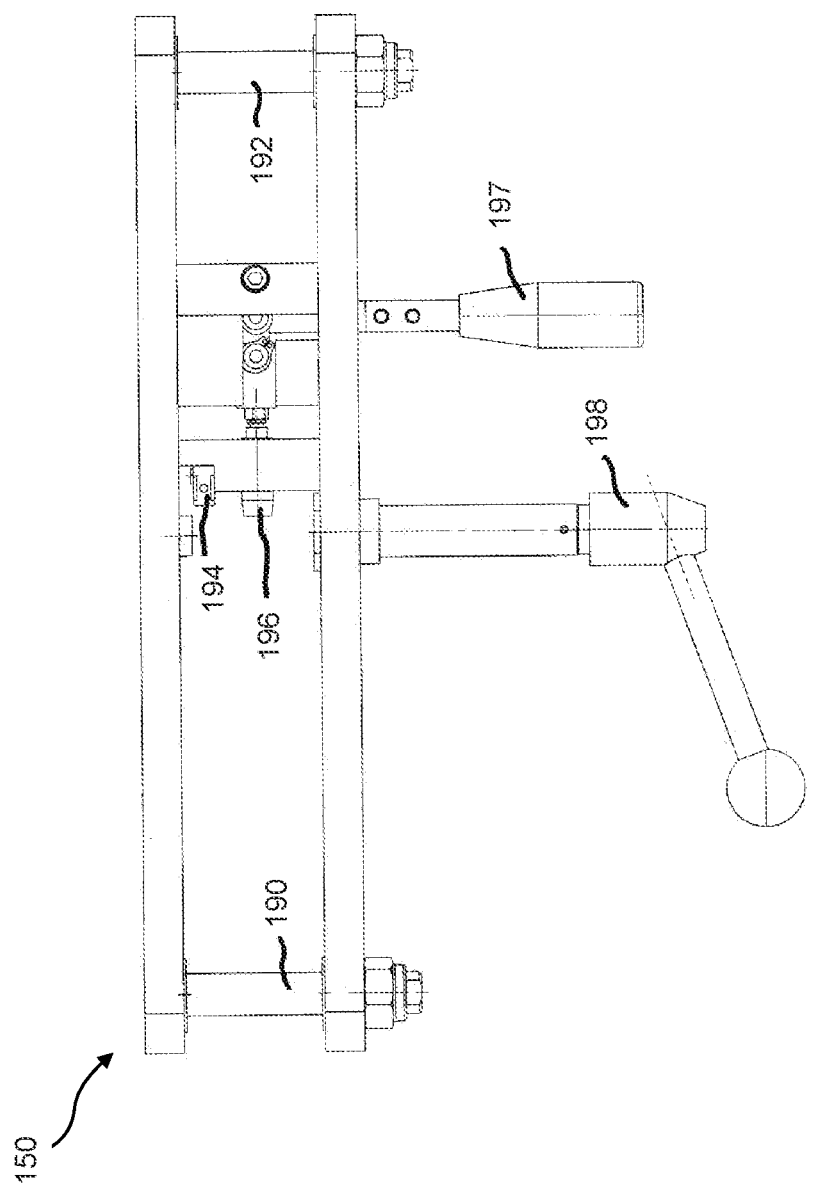
FIG. 5 is a two-dimensional view of an angle adjustment unit.

FIG. 5 shows a two-dimensional view of an angle adjustment unit 150. As described above, the angle adjustment unit 150 is coupled to the transverse frame elements 102, 104 by means of pivot joints. Bolts 190, 192 are provided for this purpose. The angle adjustment unit 150 further comprises a clamping lever 198, by means of which a set angle can be fixed so that it does not substantially change during machining of a workpiece. The cross table 100, 100' is configured to allow a 90° fixation of the stop rail 120. This means that the workpiece stop surfaces are aligned at a 90° angle to the saw line S.

To realize this, the angle adjustment unit 150 has an index bolt 196. The index bolt 196 is actuated by means of a lever 197. The angle adjustment unit 150 further comprises a sensor 194 for length correction. This can be designed, for example, as a capacitive sensor or as a reflex light barrier.

Figure 6:
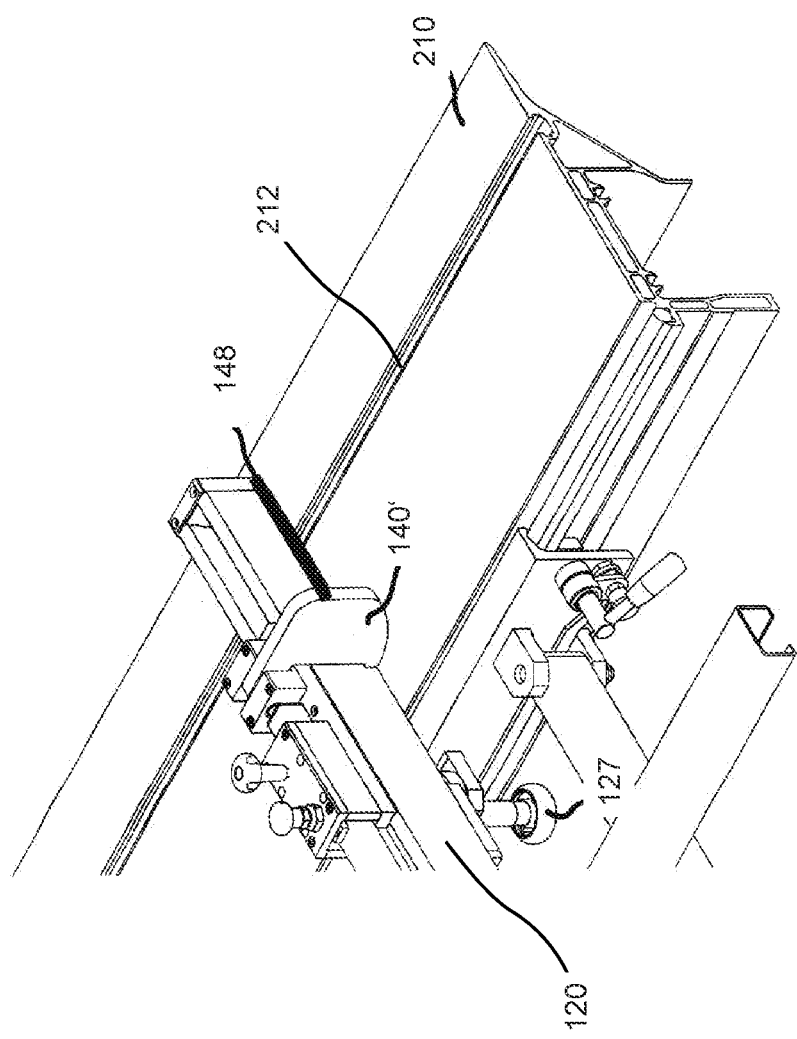
FIG. 6 is a partial perspective view of the sliding carriage with a cross table according to the invention.
Figure 7A:
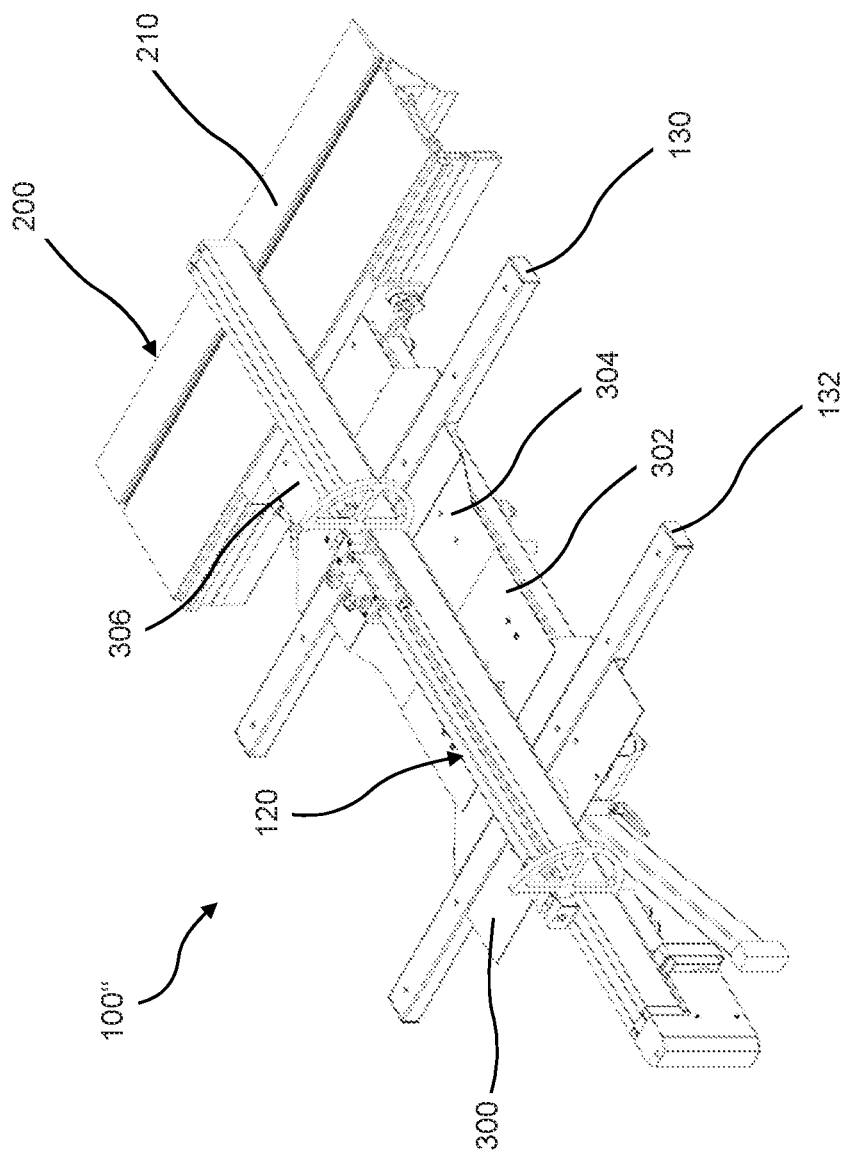
FIGS. 7a-d are perspective views of a sliding carriage equipped with a further cross table according to the invention.
Figure 7B:
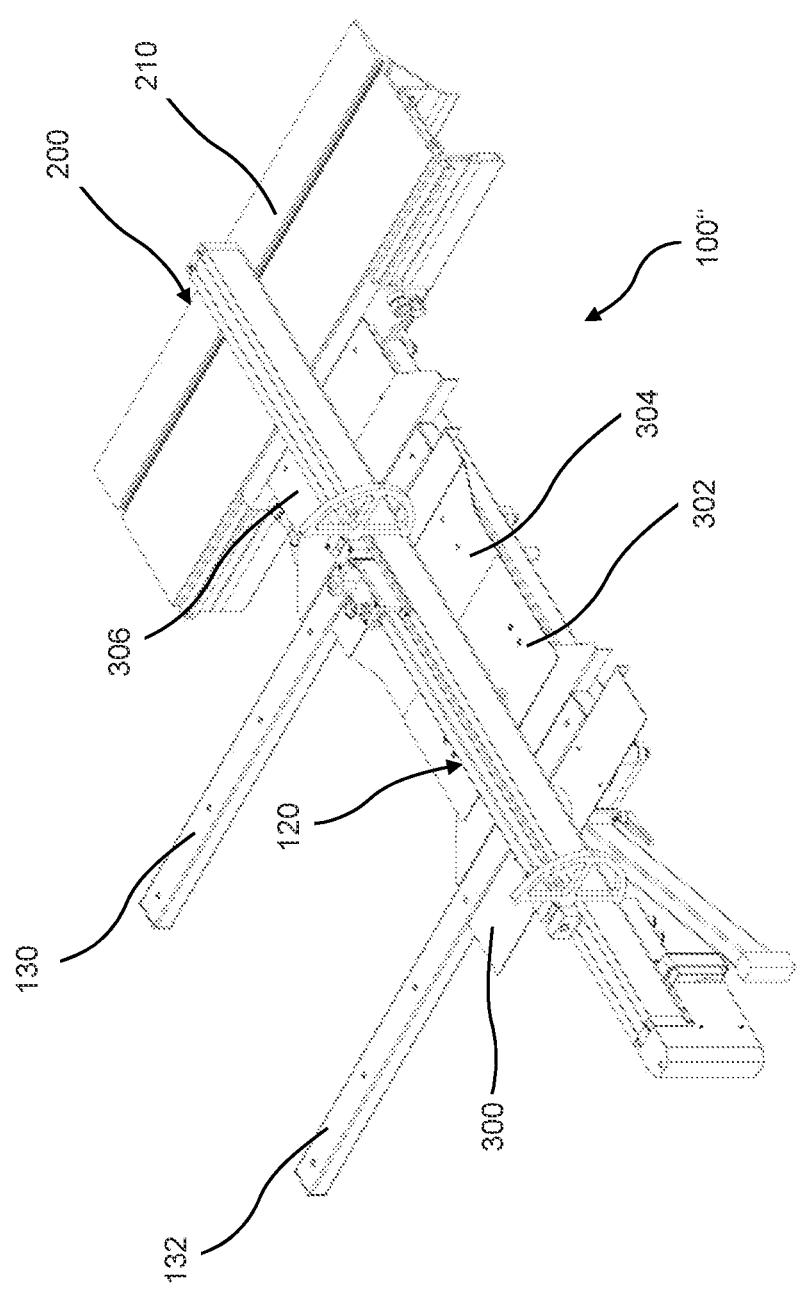
Figure 7C:
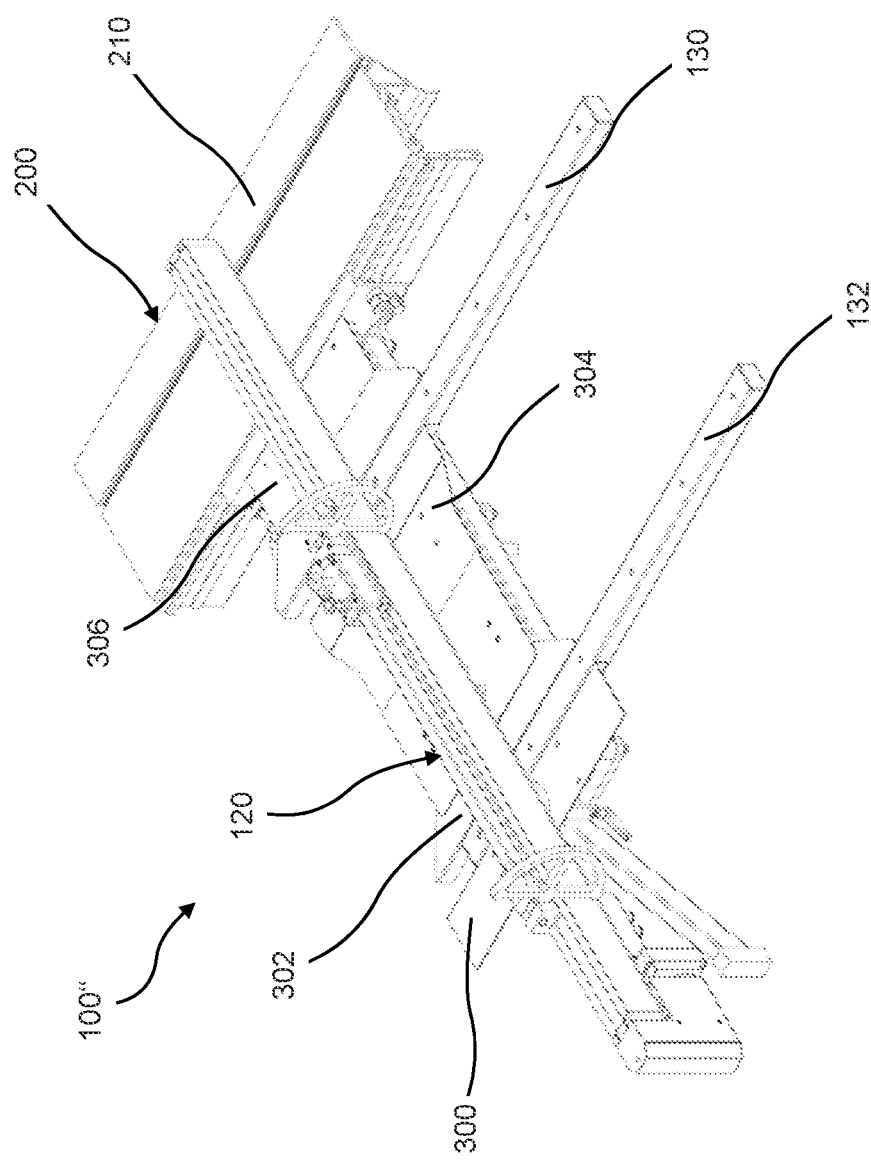
Figure 7D:
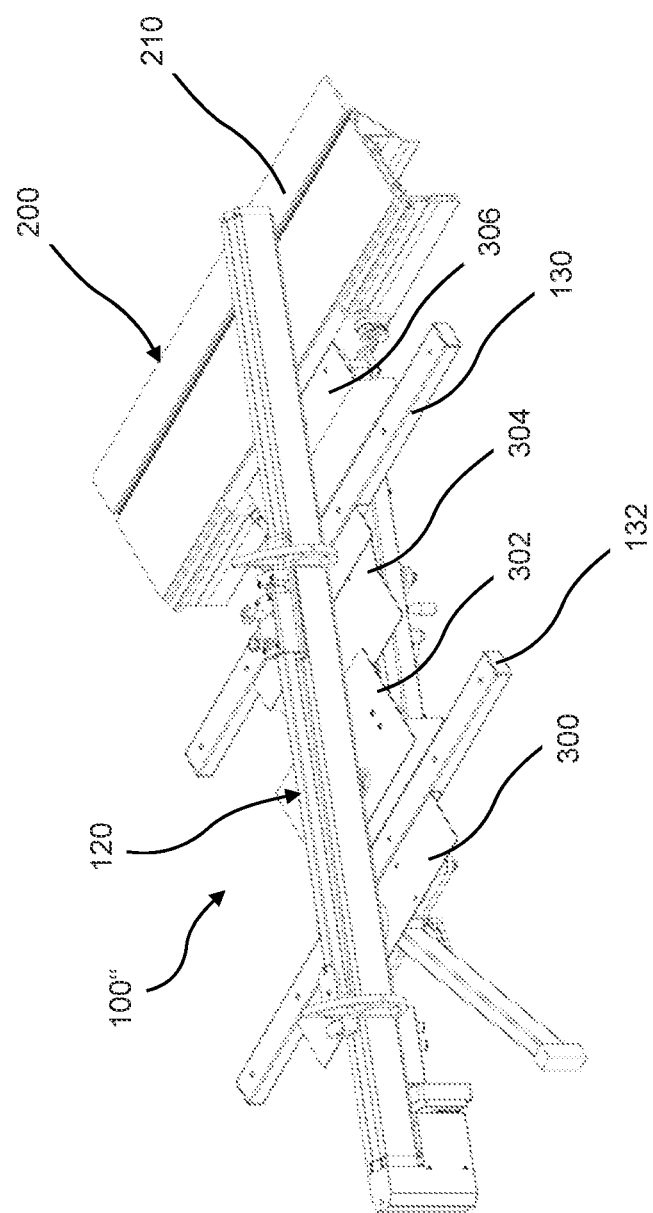

FIG. 6 shows a partial perspective view of the sliding carriage with a cross table according to the invention. The stop rail 120 is guided in the sliding carriage groove 212 by means of a pin, which is not shown. In the embodiment shown in FIG. 6, the stop rail 120 has a sensor 148. The sensor 148 is configured to detect a workpiece. The stop rail 120 preferably has, on the opposite side of the sensor 148, a further sensor for workpiece detection which is designed analogously to the sensor 148.

FIGS. 7a-7d show perspective views of a sliding carriage equipped with a further cross table 100" according to the invention. The cross table 100" has metal sheets 300, 302, 304, 306 with horizontal surfaces. The sheet 300 is arranged on the longitudinal side of the second support beam 132 facing away from the sliding carriage 200. The sheet 302 is arranged on the opposite longitudinal side of the second support beam 132. Similarly, the sheet 304 is arranged on the longitudinal side of the first support beam 130 facing away from the sliding carriage 200 and the sheet 306 is arranged on the longitudinal side of the support beam 130 facing towards the sliding carriage 200. The metal sheets 302, 304 are arranged in an overlapping manner, as can be seen, in particular, from FIG. 7d. This overlapping arrangement means that there are no pinch points on parts of the frame next to the ruler which could cause injury when a stop flap is moved along the stop ruler by motor. Even when the ruler and the cross table are swivelled, the overlapping arrangement does not result in any gaps, crevices, or the like that open or close and thereby create crushing points that could cause injury.

Figure 8:
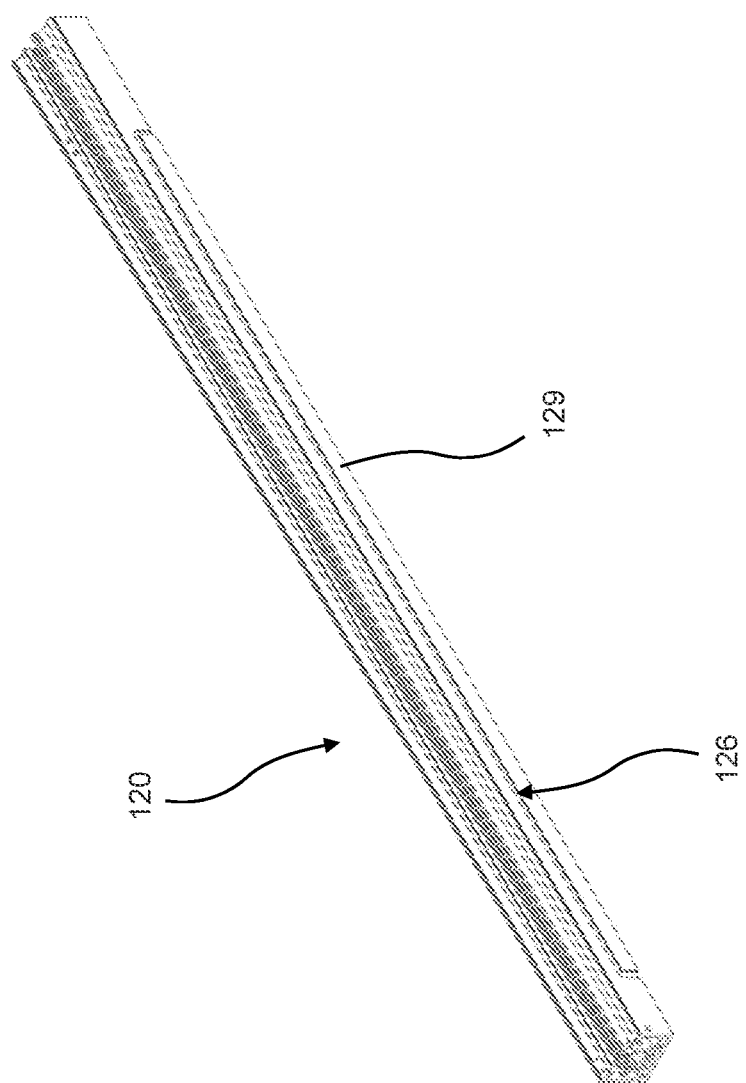
FIG. 8 is a perspective view of an exemplary embodiment of a stop rail.

FIG. 8 shows a perspective view of an exemplary embodiment of a stop rail 120. The stop rail 120 has a resilient stop bar 129 on the second workpiece stop surface 126. The stop bar 129 is preferably signal coupled to a position sensing device. When a workpiece is positioned at the second workpiece stop surface 126, the resilient stop bar 129 is pressed onto the main body of the stop rail 120. The movement of the stop bar 129 is detected by suitable sensors, so that, in turn, a contact of a workpiece with the second workpiece stop surface 126 can be detected.

Figure 9:
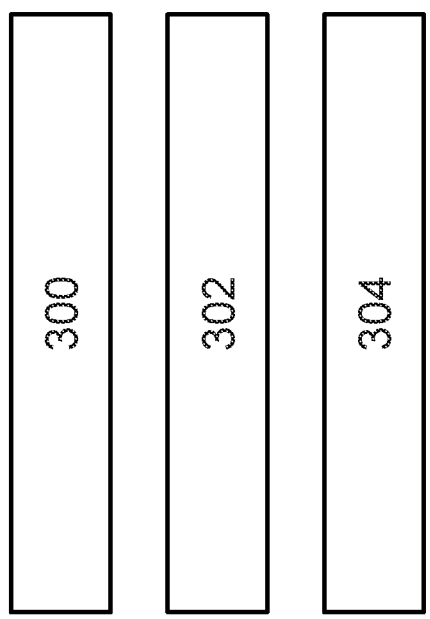
FIG. 9 is a schematic method of controlling a woodworking machine.

FIG. 9 shows a schematic method for controlling a woodworking machine, in particular, a sliding table saw, having a cross-cut table which has a stop rail with a stop flap. In step 300, a workpiece position signal is generated, wherein the workpiece position signal characterizes a positioning of a workpiece at a first workpiece stop surface or at a second workpiece stop surface of the stop rail arranged opposite the first.

In step 302, a first flap control signal is generated when the workpiece position signal characterizes a workpiece position on the first workpiece stop surface or a second flap control signal is generated when the workpiece position signal characterizes a workpiece position on the second workpiece stop surface. In step 304, the stop flap is positioned in a first flap position on a first side of the stop rail when the first flap control signal is generated, and positioned in a second flap position on a second side of the stop rail opposite the first side when the second flap control signal is generated.

The invention claimed is:

1. A cross table for a woodworking machine comprising:
   a cross table frame;
   a horizontally lying first workpiece support surface; and
   a stop rail fastened to the cross table frame above the first workpiece support surface, the stop rail further comprising:
      a vertically standing first workpiece stop surface on a first side of the stop rail, whereby a plate-shaped workpiece resting on the first workpiece support surface in a first support region arranged horizontally in front of the stop rail can be placed with a side edge against the first workpiece stop surface;
      a vertically standing second workpiece stop surface on a second side of the stop rail opposite the first side, whereby a plate-shaped workpiece resting on the first workpiece support surface in a second support region arranged horizontally behind the stop rail can be placed with the side edge against the second workpiece stop surface;
   wherein the first workpiece support surface is formed by a support surface of a first support beam;
   wherein the first support beam is arranged to be reciprocally movable back and forth relative to the cross table frame and the stop rail and the first support rail beam is not coupled with the stop rail at any time; and
   wherein such movement of the first support beam may occur when the stop rail is connected to and stationary with respect to the cross table frame.

2. The cross table according to claim 1, wherein the first support beam can be moved back and forth between:
   a first position in which the support surface of the first support beam is arranged substantially horizontally in front of the stop rail and forms the first support region; and
   a second position in which the support surface of the first support beam is arranged substantially horizontally behind the stop rail and forms the second support region.

3. The cross table according to claim 1, wherein the cross table comprises a first coupling element for coupling the cross table to a sliding carriage of the woodworking machine, wherein the first coupling element is horizontally guidable on the sliding carriage and further comprises at least one clamping element for fixing the first coupling element to the sliding carriage.

4. The cross table according to claim 1, wherein the cross table is designed as a parallelogram cross table.

5. The cross table according to claim 1, wherein the cross table comprises a first transverse frame element and a second transverse frame element, which are:
  arranged parallel to each other;
  horizontally spaced from each other; and
  coupled to one another so as to be displaceable parallel to one another, in that the first and second transverse frame elements are connected to one another in an articulated manner via a first coupling element; and
  wherein the stop rail extends substantially parallel to the first transverse frame element and to the second transverse frame element, and has a substantially equal distance from the first transverse frame element and the second transverse frame element.

6. The cross table according to claim 5, wherein the first transverse frame element and the first coupling element are interconnected by an angular displacement unit, and the angular displacement unit is arranged to cause pivoting of the first transverse frame element relative to the first coupling element and parallel displacement of the first transverse frame element relative to the second transverse frame element; and
  the first support beam is vertically supported by the first and second transverse frame elements.

7. The cross table according to claim 5, further comprising a guide element designed to guide the first support beam in the horizontal direction, wherein the guide element is arranged on the first transverse frame element and/or on the second transverse frame element.

8. The cross table according to claim 1, further comprising a second support beam; wherein the first and second support beams are horizontally spaced apart from each other.

9. The cross table according to claim 1, further comprising:
  a stop flap which is mounted so as to be movable along the stop rail and which comprises a stop flap surface which is vertically standing and aligned perpendicularly to the first and/or second workpiece stop surface.

10. The cross table according to claim 9, wherein the stop flap is adjustable between two flap positions and is arranged in a first flap position above the first support region and is arranged in a second flap position above the second support region, wherein the stop flap is arranged to be foldable about a substantially horizontal axis between the first flap position and the second flap position.

11. The cross table according to claim 10, further comprising a stop flap pivot actuator, the stop flap pivot actuator being arranged and configured to move the stop flap between the first flap position and the second flap position.

12. The cross table according to claim 11, wherein the stop flap pivot actuator is arranged and configured to move the stop flap to a travel position, the travel position being located between the first flap position and the second flap position, wherein the stop flap is vertically oriented in the travel position.

13. A woodworking machine comprising a cross table according to claim 1 movably mounted along a working direction relative to a tool on a machine frame.

14. The woodworking machine according to claim 13, further comprising:
  a sliding carriage which can be moved linearly relative to the machine frame, the cross table being arranged on the sliding carriage.

15. The woodworking machine according to claim 14, wherein the cross table is arranged on the sliding carriage so as to be pivotable about a substantially vertical table pivot axis.

16. The woodworking machine according to claim 15, wherein the cross table is configured as a parallelogram cross table and is arranged on the sliding carriage so as to be pivotable about a substantially vertical table pivot axis, the cross table being fastened to the sliding carriage by means of two pivot joints.

17. The woodworking machine according to claim 13, wherein the cross table is arranged at the sliding carriage by means of a first coupling element, and the first coupling element is arranged on the sliding carriage such that it can be moved parallel to the working direction, the first coupling element being guided on the sliding carriage, and at least one clamping element is arranged on the first coupling element, which clamping element is designed to fix the first coupling element to the sliding carriage.

18. The woodworking machine according to claim 13, wherein the sliding carriage has a second workpiece support surface arranged in alignment with the first workpiece supporting surface for supporting the workpiece, and the stop rail is arranged so as to be pivotable about a vertical stop rail pivot axis.

19. The woodworking machine according to claim 13, further comprising a detection device comprising:
  a flap sensor to detect a first flap position of a stop flap, a second flap position of the stop flap, and a travel position of the stop flap; or
  a workpiece sensor to detect a workpiece at the first workpiece stop surface or the second workpiece stop surface.

20. The woodworking machine according to claim 19, comprising a first control unit for controlling a stop flap swivel actuator;
  wherein the first control unit is arranged to receive a workpiece position signal from the detection device, the workpiece position signal characterizing a position of a workpiece at the first workpiece stop surface or the second workpiece stop surface;
  wherein the first control unit is further adapted to generate a first flap control signal when the workpiece position signal characterizes a workpiece position at the first workpiece stop surface, and to generate a second flap control signal when the workpiece position signal characterizes a workpiece position at the second workpiece stop surface; and
  wherein the stop flap pivot actuator is arranged to position the stop flap in the first flap position when the first flap control signal is received and in the second flap position when the second flap control signal is received.

21. The woodworking machine according to claim 20, wherein the woodworking machine comprises a circular saw blade and a second control unit;
  wherein the second control unit is arranged to determine a distance between the end of the stop rail facing the sliding carriage and the circular saw blade, and to control the stop rail in such a way that contact between the stop rail and the circular saw blade is prevented.

22. A method for controlling a woodworking machine according to claim 1, comprising a cross table having a stop rail with a stop flap, the method comprising the steps of:
  generating a workpiece position signal, the workpiece position signal characterizing a position of a workpiece at a first workpiece stop surface or at a second workpiece stop surface of the stop rail arranged opposite the first workpiece stop surface;
  generating a first flap control signal when the workpiece position signal characterizes a workpiece position at the first workpiece stop surface or generating a second flap control signal when the workpiece position signal characterizes a workpiece position at the second workpiece stop surface; and positioning the stop flap in a first flap position on a first side of the stop rail when the first flap control signal is generated and in a second flap position on a second side of the stop rail opposite the first side when the second flap control signal is generated, the stop flap being in a traverse position during traverse along the stop rail, the traverse position being between the first flap position and the second flap position.

\* \* \* \* \*